April 14, 1953 P. W. STUMM 2,634,802
SHOULDER HARNESS FOR VEHICLE OCCUPANTS
Filed July 31, 1951 2 SHEETS—SHEET 1

INVENTOR
PHILIP W. STUMM
BY H. L. Godfrey
ATTORNEY

Patented Apr. 14, 1953

2,634,802

UNITED STATES PATENT OFFICE 2,634,802

SHOULDER HARNESS FOR VEHICLE OCCUPANTS

Philip W. Stumm, Oklahoma City, Okla., assignor to the United States of America as represented by the Secretary of Commerce Application July 31, 1951, Serial No. 239,606

2 Claims. (Cl. 155—189)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to shoulder harnesses and more particularly to improvements therein adapted for use with pivoted back seats in airplanes.

A particular object is to provide for protection of a pilot by a shoulder harness restraining device which will prevent or reduce crash-injury from impact with forward structure, and will at the same time allow a sufficient degree of movement to permit operation of controls and other pilot duties.

An object of this invention is to provide a shoulder harness, seat assembly which is convenient, comfortable and not unsightly and which partially extends within an airplane seat back cover.

A more particular object of this invention is to provide for passengers in airplanes with pivoted seats a shoulder harness assembly which helps to protect them from injuries due to crash landings or collisions.

Other objects will appear more fully from the following description and accompanying drawings, wherein.

Figure 1:
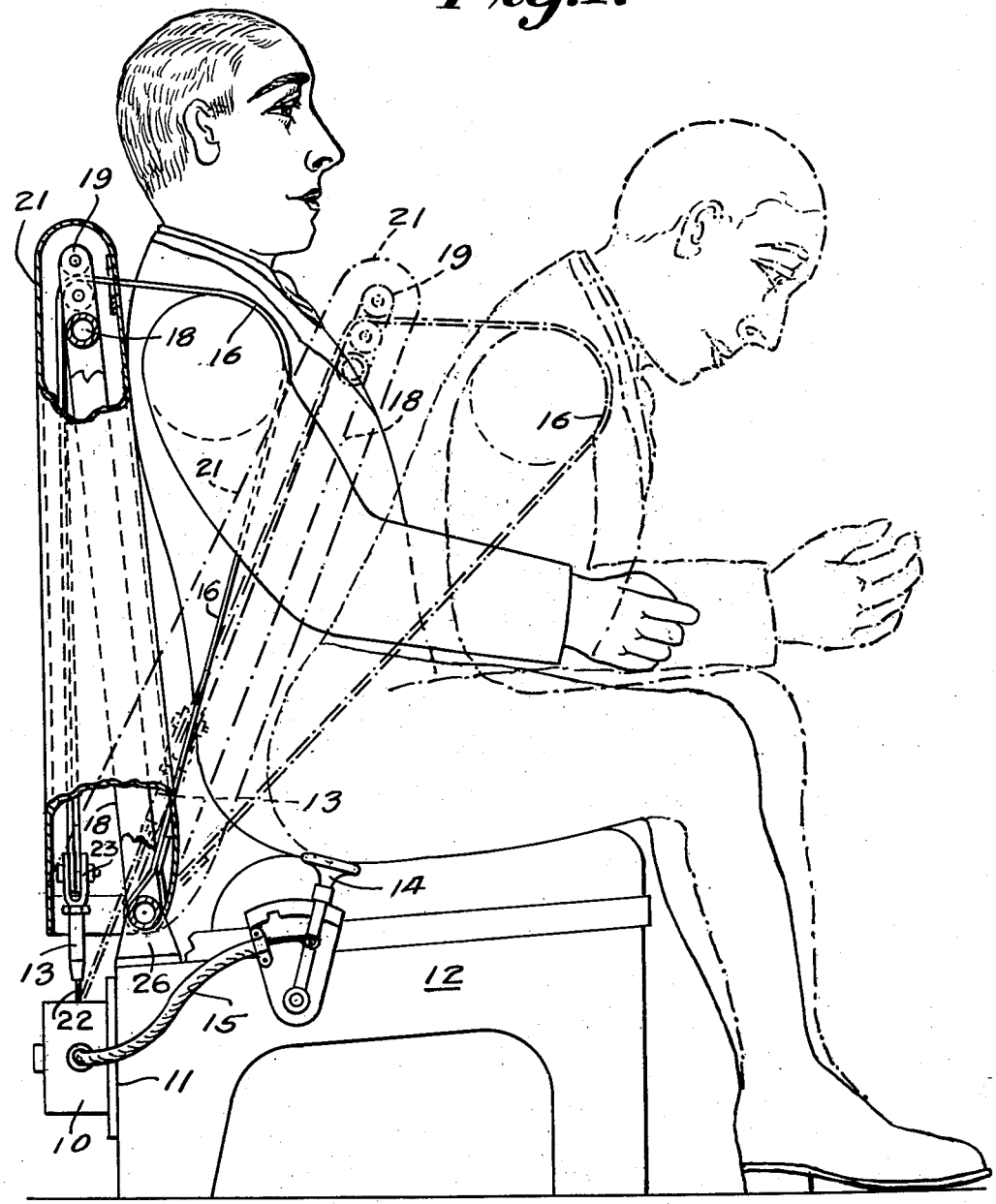
Figure 1 is a side elevation, partly in section, showing my invention as used by a passenger.
Figure 2:
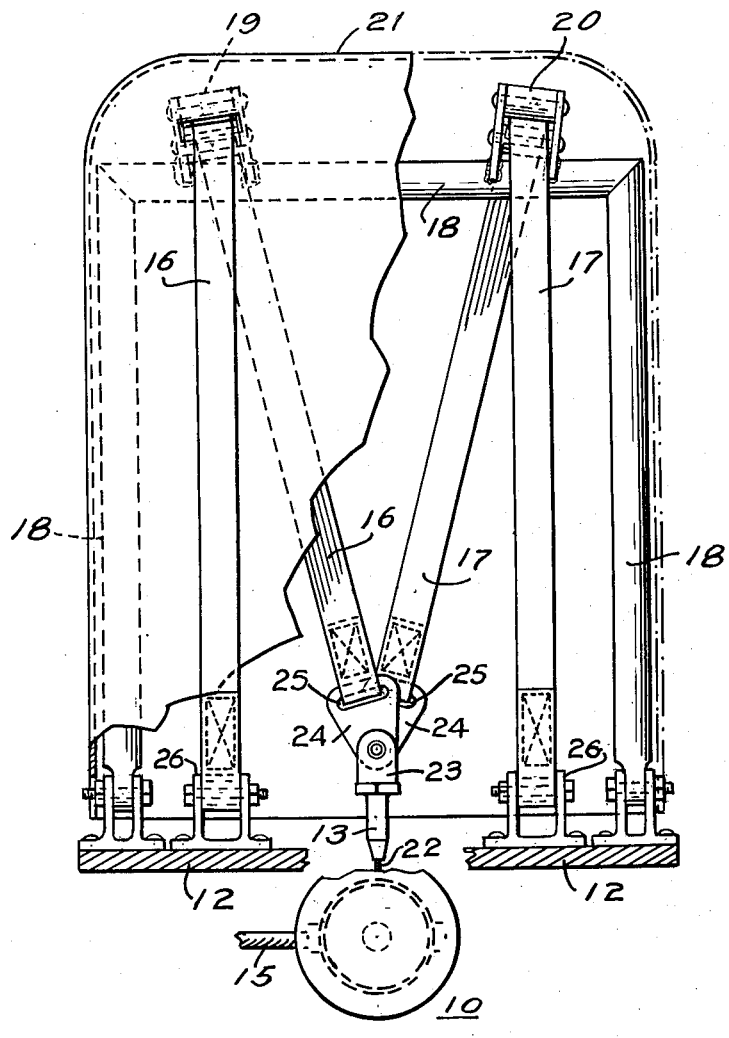
Figure 2 is a front elevation of my shoulder harness in combination with a pivoted seat back frame modified for use with my harness, and partly broken away seat back cover.

In a preferred embodiment, a yielding reel 10 is positioned near the center of the back 11 of a seat structure 12. The seat structure 12 is mounted on a rigid member of the structure of an airplane. The yielding reel 10 may take the form of an inertia reel or a locking spring assembly reel with a connecting portion 13.

When an inertia reel or other locking spring assembly is used, a manually releasable locking lever 14 is positioned near one side of the back of the seat 11 and connected to the assembly by a cable 15. The locking lever 14 will be the only means of locking the yielding means into a non-yielding position, if a spring locking assembly is used, but if an inertia reel assembly is used, it may be locked either manually by operation of the lever 14, or automatically by any shock to which the inertia reel is subjected.

The connecting portion 13 is secured to a free end of a cable 22 and to a terminal fitting 23, which in turn is pivotally connected to two fastening plates 24, each provided with a strap receiving slot 25. Each of the two shoulder straps 16 and 17 passes through a slot 25 and through a seat back cover 21 and over one of two roller guides 19 or 20 each mounted on the seat back frame 18 and horizontally displaced from each other about 12 to 14 inches. Each strap emerges from a roller guide and over the seat back cover 21, the end being pivotally attached to a strap anchor 26 secured to the seat structure adjacent to the bottom of the seat back. The roller guides 19 and 20 should be about as high as the shoulders of the average passenger who may occupy the seat.

The seat back cover 21 is mounted over the seat back frame 18 and conceals those portions of the shoulder straps 16 and 17 which are within the rear side of the seat back cover. The straps 16 and 17 are exposed on the front side of the seat back cover 21, to permit a passenger to slip his arms underneath the straps.

It is apparent that one shoulder strap may easily be slipped over each shoulder when needed. There are neither cross straps over the chest nor buckles or connections to the safety belt. The invention is also effective to protect airplane passengers against injuries due to bodily striking a seat back when an aircraft is suddenly decelerated. There are no separate harness supporting structural members near shoulder height behind the seat, such as is required in many harness assemblies and which are unsightly and may introduce a hazard to passengers in the back seats of an airplane. The design of this assembly of shoulder harness and seat back is such as to minimize injuries due to the kinetic energy of the body of a passenger when his plane crashes.

In Figure 1, there is shown in full lines the normal position of a passenger and in dot and dash lines a probable position of a passenger and the pivoted seat back when an accident suddenly checks the forward movement of an airplane. This dot and dash position illustrates a probable resultant of the kinetic energy of the passenger's body and the restraining resistance of his shoulder harness.

In this position, the forward tilting of the seat back also helps to protect another passenger in a rear seat against injuries due to striking his head against a seat.

It will be understood that the embodiment shown and described is purely illustrative and that modifications may be made therein without departing from the spirit and scope of the invention as set forth in the appended claims.

What I claim is:

1. A safety harness for vehicles which comprises a seat, a seat back frame, two spaced strap guides mounted on said frame, a seat back cover mounted upon and enclosing said seat back frame, two spaced strap anchors mounted on said seat, two shoulder straps each having one end attached to one of said strap anchors each strap passing through one of said strap guides and into said seat back cover, two fastening plates each provided with a strap receiving slot attached to a free end of each of said straps whereby said straps are prevented from twisting about one another, a terminal fitting to which said fastening plates are pivotally attached, a connecting portion fastened to said terminal fitting, a cable secured to said connecting portion, a spring operated rewinding reel on which said cable is wound and means for releasably locking said reel, whereby said straps are maintained in tension by said reel.

2. A safety device which partially extends within an airplane seat back, comprising a seat, a seat back frame, a seat back cover mounted upon and enclosing said seat back frame, two spaced strap guides each provided with a strap supporting roller mounted on said frame, a cable reel provided with a rewinding spring adapted for attachment to an airplane, a cable coupled with said cable reel, a terminal fitting including a portion for connecting the free end of said cable, two fastening plates commonly pivotally connected to said terminal fitting each provided with a slot adjacent to the free end, two shoulder straps each passing over said seat back and said roller strap guides downwardly within said seat back cover for attachment through one of said slots of said plates whereby said plates prevent said straps from twisting about one another, suitable anchoring means on said seat for the forward ends of said straps, and a manually releasable locking means for said reel whereby slack in said straps is taken up by said reel.

PHILIP W. STUMM.

References Cited in the file of this patent

UNITED STATES PATENTS

| Number | Name | Date |
|---|---|---|
| 2,148,953 | Meissner | Feb. 28, 1939 |
| 2,394,523 | Pancoe | Feb. 5, 1946 |
| 2,401,748 | Dillion | June 11, 1946 |
| 2,480,335 | Nordmark | Aug. 30, 1949 |
| 2,519,963 | Heffernan et al. | Aug. 22, 1950 |
| 2,557,313 | Quilter | June 19, 1951 |
| 2,576,867 | Wilson | Nov. 27, 1951 |

FOREIGN PATENTS

| Number | Country | Date |
|---|---|---|
| 356,862 | Great Britain | Sept. 17, 1931 |